United States Patent
Jeon et al.

(10) Patent No.: US 9,323,629 B2
(45) Date of Patent: Apr. 26, 2016

(54) METHOD FOR MANAGING PATH FAILURES OF OSEK NETWORKS

(75) Inventors: Jae Wook Jeon, Suwon-si (KR); Sung Suk Jung, Suwon-si (KR); Ho Young Jeong, Suwon-si (KR); Jin Ho Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 133 days.

(21) Appl. No.: 14/116,220

(22) PCT Filed: May 4, 2012

(86) PCT No.: PCT/KR2012/003508
§ 371 (c)(1),
(2), (4) Date: Dec. 24, 2013

(87) PCT Pub. No.: WO2012/153945
PCT Pub. Date: Nov. 15, 2012

(65) Prior Publication Data
US 2014/0143589 A1 May 22, 2014

(30) Foreign Application Priority Data
May 11, 2011 (KR) .................. 10-2011-0043816

(51) Int. Cl.
G06F 11/00 (2006.01)
G06F 11/20 (2006.01)
H04L 12/26 (2006.01)

(52) U.S. Cl.
CPC ........ G06F 11/2033 (2013.01); H04L 43/0817 (2013.01)

(58) Field of Classification Search
CPC .............. H04L 12/40032; H04L 12/5875; H04L 1/0061; H04L 2012/40215; H04L 2012/40273; H04L 51/30; H04L 69/40; H04L 29/08558; H04L 41/0631; H04L 43/065; H04L 43/067; H04L 67/12; G06F 11/2033; G06F 2209/547; G06F 9/542
USPC ....................................................... 714/4.2
See application file for complete search history.

(56) References Cited

U.S. PATENT DOCUMENTS

| | | | |
|---|---|---|---|
| 6,654,910 B1 | 11/2003 | Eibach et al. | |
| 7,801,162 B2 * | 9/2010 | Jeon et al. | 370/402 |
| 8,676,466 B2 * | 3/2014 | Mudalige | 701/93 |
| 2003/0223436 A1 | 12/2003 | Lohrmann et al. | |
| 2010/0150176 A1 * | 6/2010 | Yakashiro | 370/475 |

FOREIGN PATENT DOCUMENTS

JP   2009-71773 A    4/2009

OTHER PUBLICATIONS

Suwatthikul et al., Adaptive OSEK Network Management for In-vehicle Network Fault Detection, 2007, IEEE.*
Wei, C. et al., "OSEK/VDX-based dynamic network management on automotive network," IEEE International Conference on Embedded Software and Systems, ICESS'09, 2009 (7 Pages).
Kim J. et al., "OSEK NM Body System," Research on a design of OSEK-NM-based-Body System, NuriMedia Co., Ltd., 2006 (6 pages).
International Search Report issued on Dec. 27, 2012 in International Application No. PCT/KR2012/003508 (5 pages).

* cited by examiner

Primary Examiner — Bryce Bonzo
Assistant Examiner — Elmira Mehrmanesh
(74) Attorney, Agent, or Firm — NSIP Law

(57) ABSTRACT

Disclosed herein is a method of managing the path of an OSEK network. The method of managing the path of an OSEK network includes step S1 at which a message is transferred along nodes of the OSEK network; step S2 at which a failed node at which a network failure has occurred is detected while the message is being transferred at step S1; step S3 at which the failed node of step S2 is eliminated from the overall network; and step S4 at which the message is transferred from a source node that has transferred the message to the failed node of step S2 to a target node to which the failed node will transfer the message by connecting the source node with the target node.

10 Claims, 5 Drawing Sheets

US 9,323,629 B2

METHOD FOR MANAGING PATH FAILURES OF OSEK NETWORKS

CROSS-REFERENCE TO RELATED APPLICATIONS

This application is a National Stage of International Application No. PCT/KR2012/003508, filed May 4, 2012 and published as WO2012/153945 on Nov. 15, 2012, which claims the benefit of KR Patent Application No. 10-2011-0043816, filed on May 11, 2011, the entire disclosures of which are incorporated herein by reference for all purposes.

BACKGROUND OF THE INVENTION

1. Field of the Invention

The present invention relates to a method of managing the message path of an Offene Systeme and deren Schnittstellen für die Elektronik in Kraftfahrzeugen (OSEK) network. More particularly, the present invention relates to a method of, if a network failure has occurred at a specific node of an OSEK network, eliminating only the corresponding node from the path of the network path and then reestablishing a path.

2. Description of the Related Art

Units that are responsible for functions in automobiles corresponding to those of the brain and neurons of a human are an electronic control unit (ECU) and a communication network. Recently, the core mechanical units of automobiles, such as an engine, a transmission, a steering device, a braking device, a suspension, etc., have evolved in a direction that enables them to be more finely controlled and that provides more comfort and convenience to a driver and passengers. In line with this evolution, the number of ECUs has increased in proportion to the level of automobiles and the importance of ECUs is increasing.

OSEK is applied to 70% of operating systems (OSs) for automobiles, which are core software implementations that provide ECU operation environments. In a conventional OSEK-based communication network environment, although a Network Management (NM) forms a bus topology, it actually operates in a ring topology.

All nodes having IDs unique within a network transmit alive messages at the same time, thereby becoming aware of all linked nodes and then configuring a network. Based on the IDs of the respective IDs, a network system is managed, for example, in such a way that a node having an ID of 1 transmits data to a node having an ID of 2, the node having an ID of 2 transmits data to a node having an ID of 3 and so on in a sequential manner. Upon the transmission of such a message, each node transmits the message over a fixed constant time TMax.

If a network failure has occurred and thus a specific node has not transferred a message to a subsequent node within TMaxtime, this specific node becomes a failed node. Thereafter, in order to restore a network to a new ring topology path, a network is reset, and all nodes transmit alive messages at the same time and receive alive messages from all the other nodes, thereby reconfiguring the network. An NM makes the failed node be temporarily excluded from a ring topology path, and makes the failed node participate in the ring topology path when it normally operates again.

When the number of nodes in a network is large, a large amount of data is transmitted to a bus, and thus many problems, such as collision, retransmission, transmission time delay, etc., may occur, with the result that more reliable data transmission is required.

SUMMARY OF THE INVENTION

An OSEK network path management method according to the present invention has the following objects.

First, it is desired to eliminate only a node in which a failure has occurred from a path on an OSEK network and to smoothly transfer a message.

Second, if a failure has occurred in an OSEK network, it is not desired to reconfigure an overall path but it is desired to reconfigure a partial path by connecting a node previous to a failed node with a subsequent node.

Third, if a node has recovered from a failure, it is desired to restore a current path to a path that was present before the occurrence of the failure and transfer a message along the restored path.

The objects of the present invention are not limited to the above-described ones, and other objects that have not been described above will be apparent to those skilled in the art from the following description.

In order to accomplish the above objects, the present invention provides a method of managing the path of an OSEK network, including step S1 at which a message is transferred along nodes of the OSEK network; step S2 at which a failed node at which a network failure has occurred is detected while the message is being transferred at step S1; step S3 at which the failed node of step S2 is eliminated from the overall network; and step S4 at which the message is transferred from a source node that has transferred the message to the failed node of step S2 to a target node to which the failed node will transfer the message by connecting the source node with the target node.

Step S2 may include a step at which, if a node that has received the message has not transferred the message within a reference time, the node that has received the message is detected as the failed node.

Step S3 may include a step at which the failed node is excluded from a configuration of the network by eliminating the failed node from a node ID table that manages nodes of the network.

The method may further include step S5 of detecting whether a network failure has occurred at the target node of step S4, and, if a network failure is detected at the target node, connecting the source node with a second target node to which the target node will transfer the message, thereby transferring the message from the source node to the second target node.

The method may further include step S6 of, if the failed node has recovered from the network failure, connecting the source node with the failed node, and connecting the failed node with the target node, thereby making a recovery so that the message is transferred from the source node through the failed node to the target node.

In accordance with another aspect of the present invention, there is provided a method of managing the path of an OSEK network, including step "a" at which a ring-type message path having a sequential message transfer topology is established in an OSEK network having a bus topology; step "b" at which a failed node at which a network failure has occurred is detected while the message is being transferred along the message path of step "a"; step "c" at which the failed node detected at step "b" is eliminated from the message path; step "d" at which a message path is reestablished by connecting a source node, that is, a node previous to the failed node, with a target node, that is, a node subsequent to the failed node; and step "e" at which if the failed node has recovered from the network failure, the message path is restored by connecting the source node with the failed node and connecting the failed node with the target node.

Step "b" may include a step at which, if a node that has received the message has not transferred the message within a reference time, the node that has received the message is detected as the failed node.

Step "c" may include a step at which the failed node is excluded from a configuration of the network by eliminating the failed node from a node ID table that manages nodes of the network.

Steps "b" to "d" may be repeated while the message is being transferred along the message path.

Step "e" may include a step of, in order to detect whether the failed node has recovered from the failure, determining whether a message has been transferred to the set node by transferring the message to the failed node every reference time.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
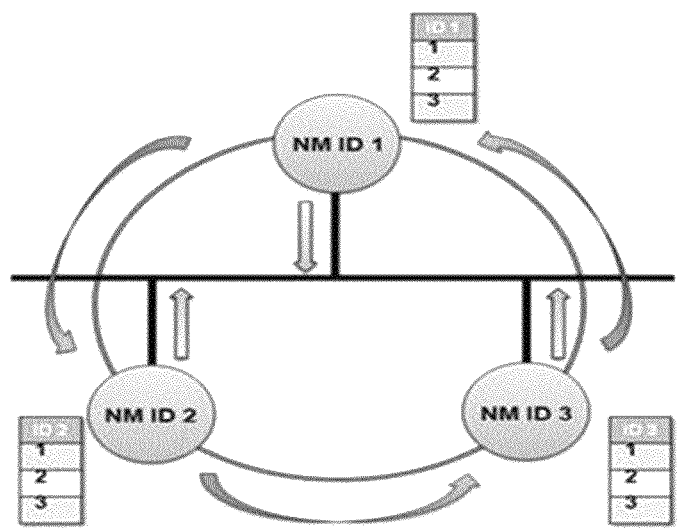
FIG. 1A is a structural diagram illustrating an example of an OSEK network.

Although the present invention may be subjected to various modifications and may have various embodiments, specific embodiments will be illustrated in the drawings, and will be described in detail in the detailed description. However, this is not intended to limit the present invention to the specific embodiments, and should be construed to include all modifications, equivalents and replacements that come within the spirit and technical scope of the present invention.

Although the terms "first," "second," "A," "B," etc. may be used to describe various components, the terms do not limit the corresponding components, but are used only for the purpose of distinguishing one component from another component. For example, without departing from the range of the rights of the present invention, a first component may be referred to as a second component, and similarly the second component may be referred to as the first component. The term "and/or" refers to a combination of a plurality of related, described items or any of the plurality of related, described items.

In terms used herein, singular expressions include plural expressions unless explicitly construed otherwise in the context thereof. It should be appreciated that the terms "include(s)," "comprise(s)", "including" and "comprising" are intended to indicate the presence of the characteristics, numbers, steps, operations, elements, or parts described herein, or combinations thereof, but are not intended to exclude the possibility of presence or addition of one or more other characteristics, numbers, steps, operations, elements, parts, or combinations thereof.

A method of managing the path of an OSEK network will be described in detail below with reference to the drawings.

Prior to the detailed description of the drawings, it is clearly noted that the elements of the present invention herein are divided merely based on the primary functions of the elements. Accordingly, two or more elements that will be described herein may be combined into a single element, or a single element may be divided into two or more elements and provided based on detailed functions. Each of the elements that will be described herein may take charge of part or all of the function of another element as well as its primary function, and part of the main function of each of the elements may be performed by another element. In the present invention, which is a method invention, the order of steps or functions that are performed by the steps may be changed, or a specific step may be replaced with a technology that is known to and may be replaced by those skilled in the art.

Figure 1B:
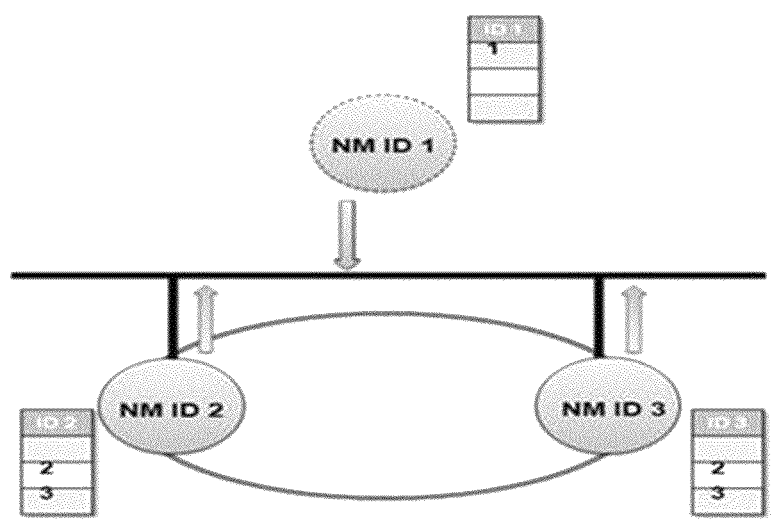
FIG. 1B is a diagram illustrating a conventional structure for establishing a path when a failure has occurred in an OSEK network.

FIG. 1A is a structural diagram illustrating an example of an OSEK network, and FIG. 1B is a diagram illustrating a conventional structure for establishing a path when a failure has occurred in an OSEK network.

As illustrated in FIG. 1A, in an OSEK-based communication network environment, although a Network Management (NM) forms a bus topology, it actually operates in a ring topology. Nodes having IDs unique within a network sequentially transmit data to subsequent nodes based on the IDs. A network system is managed, for example, in such a way that a node having an ID of 1 transmits data to a node having an ID of 2, the node having an ID of 2 transmits data to a node having an ID of 3 and so on in a sequential manner.

Upon the transmission of such a message, each node has a fixed constant time. If the node has not transmitted data within the maximum delay time TMax, it is determined that the node that has not transmitted the message has failed. Hereinafter the corresponding node is referred to as a failed node. In this case, the reconfiguration of a network is required.

Hereinafter the maximum delay time is referred to as a reference time. For the reference time, a time generally set in an OSEK network may be used, or a user or a system may set a time in advance based on network environmental conditions.

FIG. 1B illustrates a conventional structure for establishing a path when a failure has occurred in the conventional OSEK network.

In the conventional technology, if a failure has occurred in a network and thus a specific node has not transferred a message to a subsequent node within a reference time, a failed node occurs. Thereafter, in order to restore the network to a new logic ring topology, all nodes should be subjected to network reset and alive message transmission processes, and each of the nodes receives alive messages from all nodes except for itself and rearranges the ID memory so that sequential communication can be performed, thereby reconfiguring the network.

In the present invention, when a failure occurs in an OSEK-based communication network system, each node becomes aware of a failed node, and then eliminates the corresponding node from ID memory. A node previous to the failed node transmits a message to a subsequent node, thereby being able to recover the network without going through reset and alive message transmission processes. This is intended to overcome a problem that may occur when a large amount of data is concentrated on a bus in reset and alive message transmission processes.

Referring to FIG. 1B, a node ID 1, a node ID 2 and a node ID 3 transmit alive messages to a bus via a bus (indicated by a red arrow). Thereafter, once the overall network has been reconfigured, a failed node ID 1 is eliminated.

Figure 2:
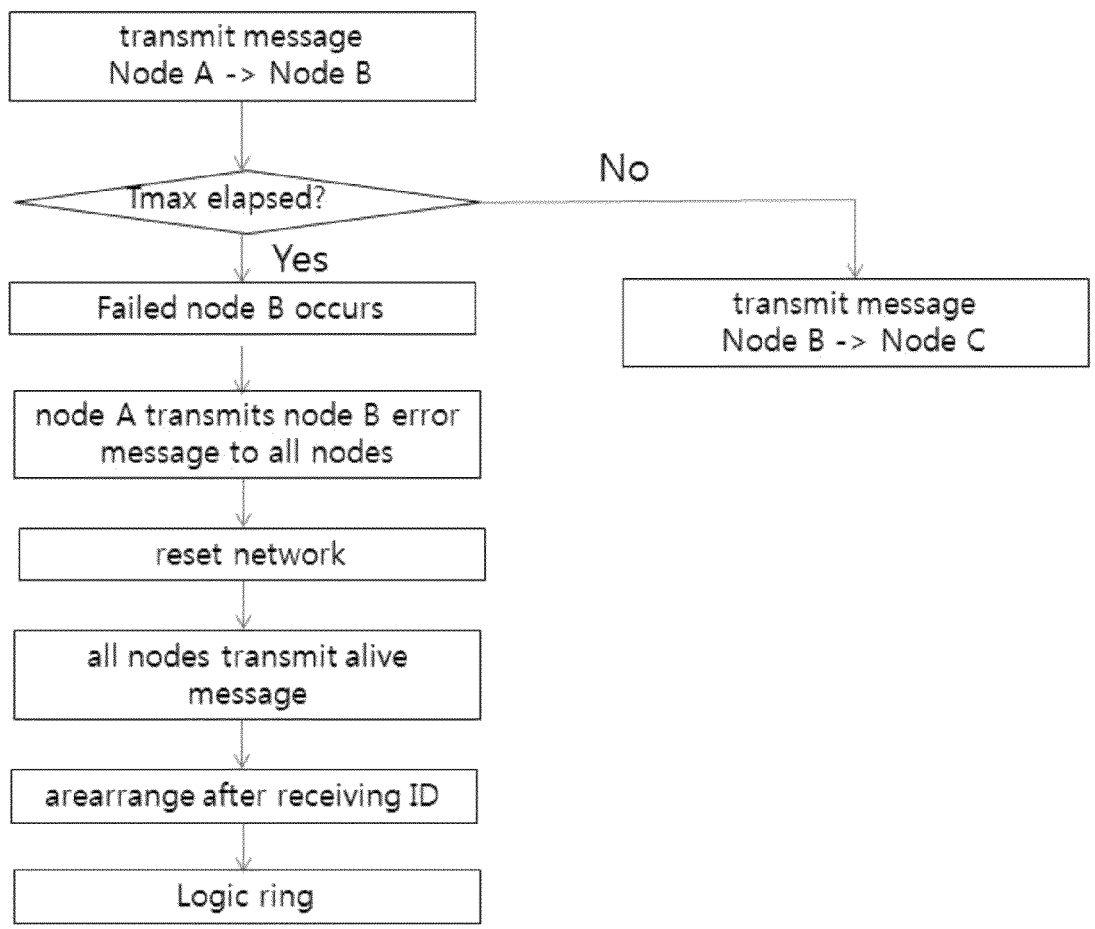
FIG. 2 is a flowchart illustrating a conventional method of reestablishing a path when a failure has occurred in an OSEK network.

FIG. 2 is a flowchart illustrating a conventional method of reestablishing a path when a failure has occurred in an OSEK network.

In the conventional algorithm, if a node A transmits a message to a node B and message transmission is performed within the reference time, a network performs normal communication. If not, the node B becomes a failed node, the node A transmits a message indicative of the failure of the node B to all nodes, and the network is reset. Thereafter, all the nodes transmit alive messages, and all the nodes that have received the messages rearrange the IDs of the respective nodes and form a new logic ring, thereby reconfiguring the network.

Figure 3:
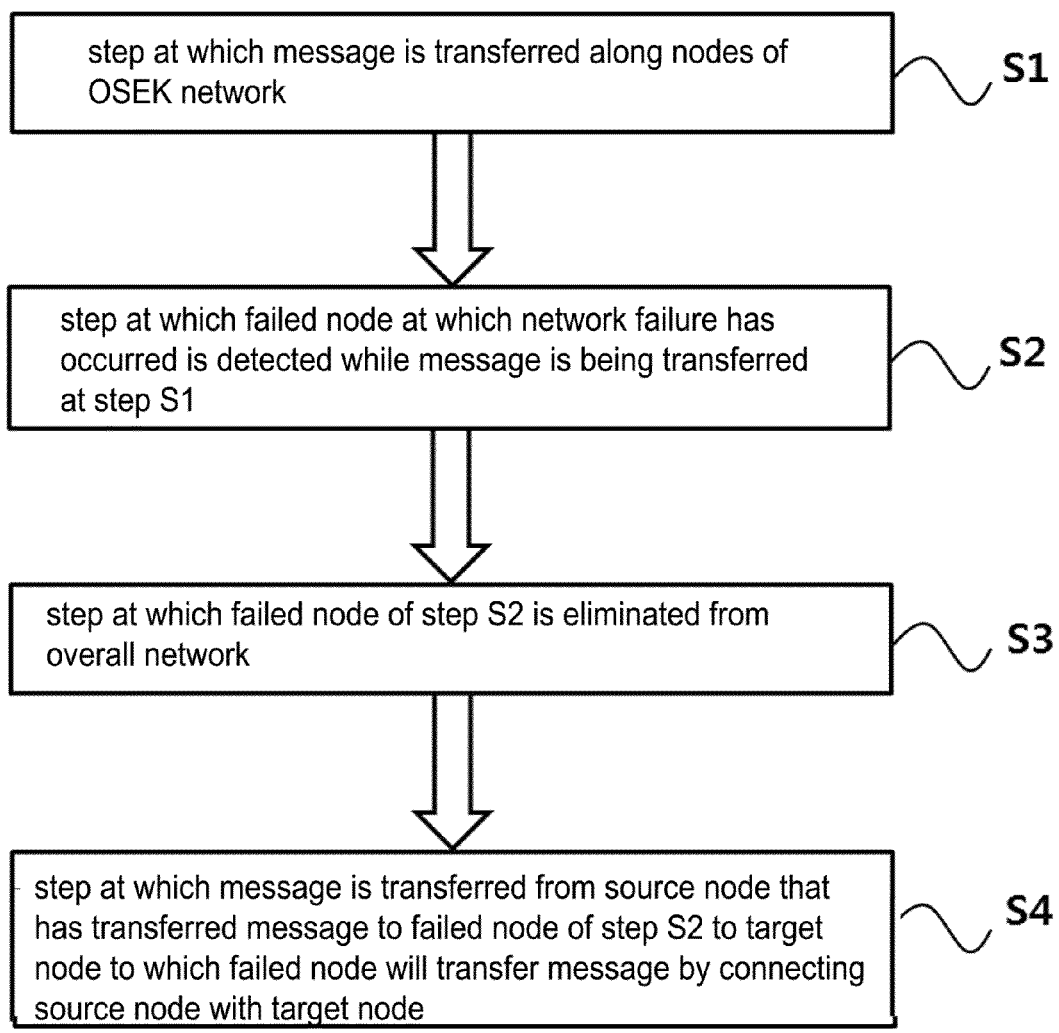
FIG. 3 is a flowchart illustrating a method of managing the path of an OSEK network according to an example of the present invention.

FIG. 3 is a flowchart illustrating a method of managing the path of an OSEK network according to an example of the present invention.

The method of managing the path of an OSEK network according to this embodiment of the present invention includes step S1 at which a message is transferred along nodes of the OSEK network; step S2 at which a failed node at which a network failure has occurred is detected while the message is being transferred at step S1; step S3 at which the failed node of step S2 is eliminated from the overall network; and step S4 at which the message is transferred from a source node that has transferred the message to the failed node of step S2 to a target node to which the failed node will transfer the message by connecting the source node with the target node.

At step S2, if the node that has received the message has not transferred the message within the reference time, the node that has received the message is detected as a failed node.

A previous node that has transferred the message to the failed node is referred to as a source node, and a subsequent node to which the failed node will transfer the message is referred to as a target node. In the OSEK network, each node present within the network has a node ID table in which the IDs of nodes have been stored, and manages the nodes using the node ID table. Meanwhile, each node has node ID information about its previous and subsequent nodes. Each node can become aware of the previous and subsequent nodes using the ID information, and the present invention reestablishes a node path using this information.

At step S3, the failed node is excluded from the configuration of the network by eliminating the failed node from a node ID table that manages the nodes of the network. If the failed node is eliminated from the node ID table, it is considered that the corresponding failed node is not present in the overall network. Meanwhile, to provide for the case where the failed node recovers from the failure, information about the node ID of the failed node is maintained in a separately stored table.

The method of managing the path of an OSEK network according to this embodiment of the present invention may further include step S5 of detecting whether a network failure has occurred at the target node of step S4, and, if a network failure is detected at the target node, connecting the source node with a second target node to which the target node will transfer the message, thereby transferring the message from the source node to the second target node.

That is, if the target node that is connected to the source node at step S4 has failed, the target node is eliminated, and a node subsequent to the target node establishes a path that connects the second target node with the source node.

The method of managing the path of an OSEK network according to this embodiment of the present invention may further include step S6 of, if the failed node has recovered from the network failure, connecting the source node with the failed node, and connecting the failed node with the target node, thereby making a recovery so that the message is transferred from the source node through the failed node to the target node.

If the failed node has recovered from the network failure, a message path is restored to a path from which the failed node has not been eliminated.

Figure 4:
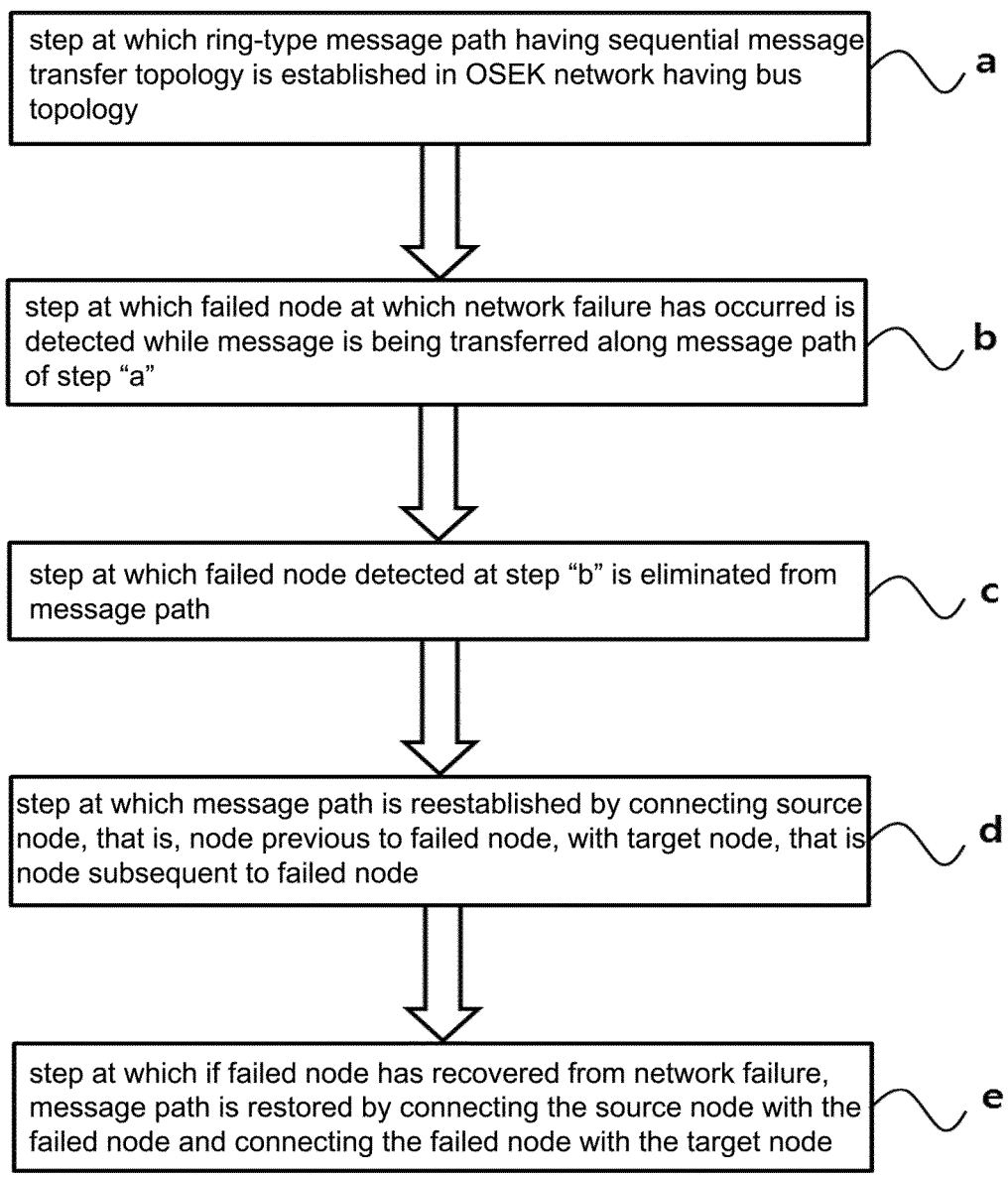
FIG. 4 is a flowchart illustrating a method of managing the path of an OSEK network according to another example of the present invention.

FIG. 4 is a flowchart illustrating a method of managing the path of an OSEK network according to another example of the present invention.

The method of managing the path of an OSEK network according to the other embodiment of the present invention includes step "a" at which a ring-type message path having a sequential message transfer topology is established in an OSEK network having a bus topology; step "b" at which a failed node at which a network failure has occurred is detected while the message is being transferred along the message path of step "a"; step "c" at which the failed node detected at step "b" is eliminated from the message path; step "d" at which a message path is reestablished by connecting a source node, that is, a node previous to the failed node, with a target node, that is, a node subsequent to the failed node; and step "e" at which if the failed node has recovered from the network failure, the message path is restored by connecting the source node with the failed node and connecting the failed node with the target node.

At step "b," if a node that has received the message has not transferred the message within the reference time, the node that has received the message is detected as a failed node.

At step "c," the failed node is excluded from the configuration of the network by eliminating the failed node from a node ID table that manages the nodes of the network.

It is preferred that steps "b" to "d" be repeated while the message is being transferred along the message path. If a failed node occurs during the message transfer, the message path is reestablished using a method of eliminating only the corresponding failed node.

To detect whether the failed node has recovered from the failure, it is preferred to determine whether a message has been transferred to the set node by transferring the message to the failed node every reference time at step "e."

If the failed node does not recover from the failure, node resources may be exhausted. Accordingly, a node that has recovered from a failure is reused on a message path by separately managing the failed node and checking whether the failed node has recovered from the failure.

Figure 5:
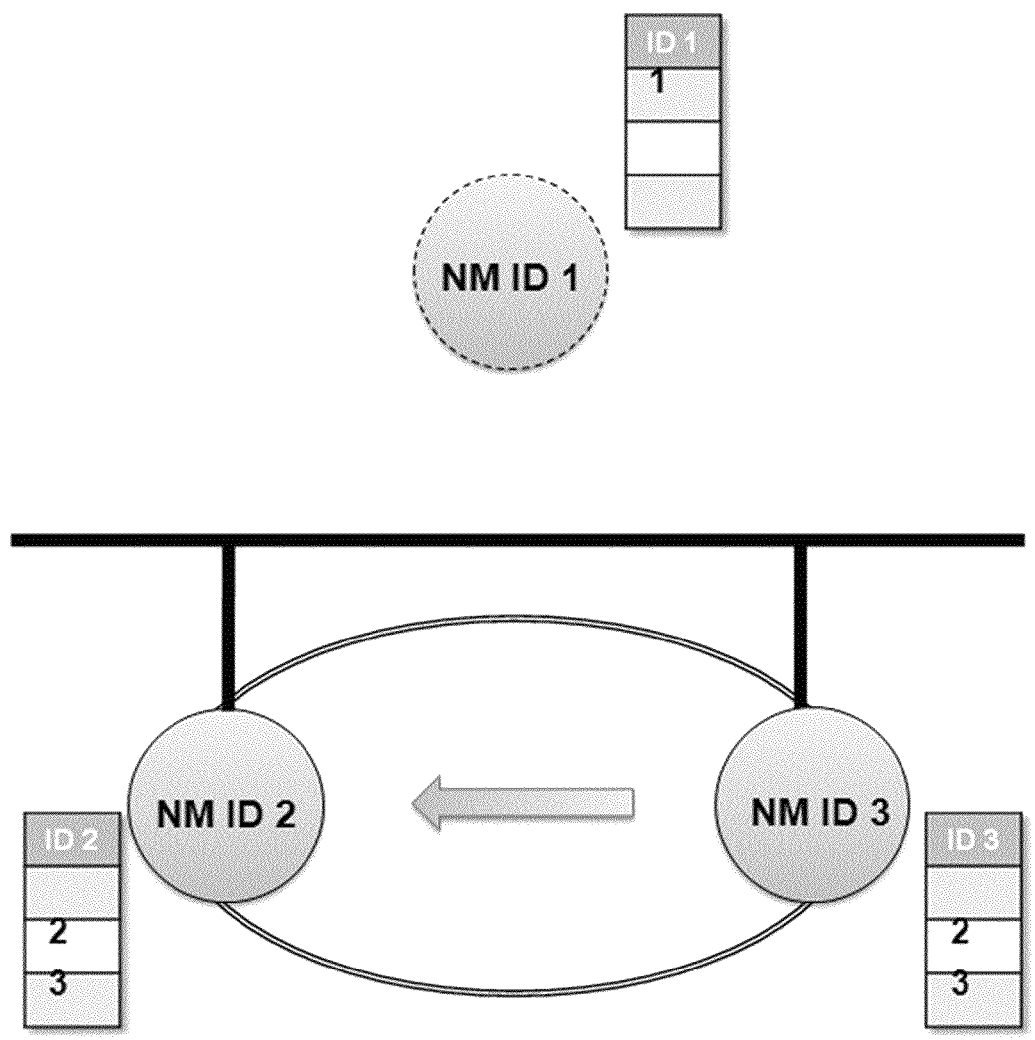
FIG. 5 is a structural diagram illustrating an example of a method of reestablishing the path of an OSEK network according to the present invention.

FIG. 5 is a structural diagram illustrating an example of a method of reestablishing the path of an OSEK network according to the present invention.

In the conventional technology, if a failure has occurred in a network, a failed node occurs. Thereafter, in order to restore the network, the ID of the failed node is eliminated from a node ID table (memory) without network reset and alive message transmission processes, and a node previous to the failed node transmits a logic ring message to a node subsequent to the failed node in order to configure a new ring topology path, thereby reconfiguring the network.

As illustrated in FIG. 2, a message is transferred in the sequence of a node ID 1, a node ID 2 and a node ID 3. In this case, the node ID 1 has not transferred the message within the reference time. Furthermore, in this case, the node ID 3 transmits a failure message to the network, thereby eliminating the node ID 1 from the node ID table, transmits an alive message to the node ID 2, and then configures a path from the node ID 3 to the node ID 2. In FIG. 5, three nodes have been taken as an example, and the node ID 3 and the node ID 2 constitute a ring topology in a sequential manner.

This embodiment and the drawings attached to the present specification clearly illustrate merely part of technical spirit included in the present invention. It will be apparent that modified examples and specific embodiments that can be easily inferred by those skilled in the art within the scope of the technical sprit included in the present specification and the drawings all fall within the range of the rights of the present invention.

The method of managing the path of an OSEK network according to the present invention, when message transmission is not performed at a specific node because of a network failure in an OSEK-based communication network system, a message is transmitted to all nodes linked to a network by a node previous to the failed node, and thus the other nodes become aware of the failed node, thereby forming a new ring topology path.

This enables many problems of the present invention including collision attributable to a large amount of data, retransmission occurring upon collision, and transmission time delay, etc. to be overcome, and enhances real-time performance, thereby constructing a more reliable and efficient communication network system.

The advantages of the present invention are not limited to the above-described ones, but other advantages that have not been mentioned will be apparent to those skilled in the art from the detailed description.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of managing a path of an OSEK network, comprising:
    step S1 at which a message is transferred along nodes of the OSEK network;
    step S2 at which a failed node at which a network failure has occurred is detected while the message is being transferred at step S1;
    step S3 at which the failed node of step S2 is eliminated from the network; and
    step S4 at which the message is transferred from a source node that has transferred the message to the failed node of step S2 to a target node to which the failed node will transfer the message by establishing connection between the source node and the target node, the connection being established in response to detection of the failed node at step S2 and prior to elimination thereof at step S3.

2. The method of claim 1, wherein step S2 comprises a step at which, if a node that has received the message has not transferred the message within a reference time, the node that has received the message is detected as the failed node.

3. The method of claim 1, wherein step S3 comprises a step at which the failed node is excluded from a configuration of the network by eliminating the failed node from a node ID table that manages nodes of the network.

4. The method of claim 1, further comprising step S5 of detecting whether a network failure has occurred at the target node of step S4, and, if a network failure is detected at the target node, connecting the source node with a second target node to which the target node will transfer the message, thereby transferring the message from the source node to the second target node.

5. The method of claim 1, further comprising step S6 of, if the failed node has recovered from the network failure, connecting the source node with the failed node, and connecting the failed node with the target node so as to recover the failed node and transfer the message from the source node through the failed node to the target node.

6. A method of managing a path of an OSEK network, comprising:
    step "a" at which a ring-type message path having a sequential message transfer topology is established in an OSEK network having a bus topology;
    step "b" at which a failed node at which a network failure has occurred is detected while the message is being transferred along the message path of step "a";
    step "c" at which the failed node detected at step "b" is eliminated from the message path;
    step "d" at which a message path is reestablished by connecting a source node, comprising a node previous to the failed node, with a target node comprising a node subsequent to the failed node, the message path being reestablished through connection of the source node with the target node in response to detection of the failed node at step "b" and prior to elimination of the failed node at step "c"; and
    step "e" at which if the failed node has recovered from the network failure, the message path is restored by connecting the source node with the failed node and connecting the failed node with the target node.

7. The method of claim 6, wherein step "b" comprises a step at which, if a node that has received the message has not transferred the message within a reference time, the node that has received the message is detected as the failed node.

8. The method of claim 6, wherein step "c" comprises a step at which the failed node is excluded from a configuration of the network by eliminating the failed node from a node ID table that manages nodes of the network.

9. The method of claim 6, wherein steps "b" to "d" are repeated while the message is being transferred along the message path.

10. The method of claim 6, wherein step "e" comprises a step of, in order to detect whether the failed node has recovered from the failure, determining whether a message has been transferred to the failed node by transferring the message to the failed node every reference time.

* * * * *